(No Model.)
G. THEOBALD.
SADDLETREE.
No. 564,726. Patented July 28, 1896.
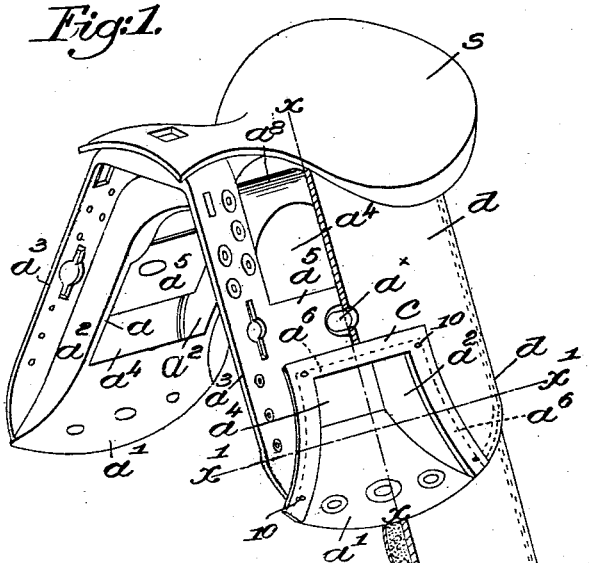
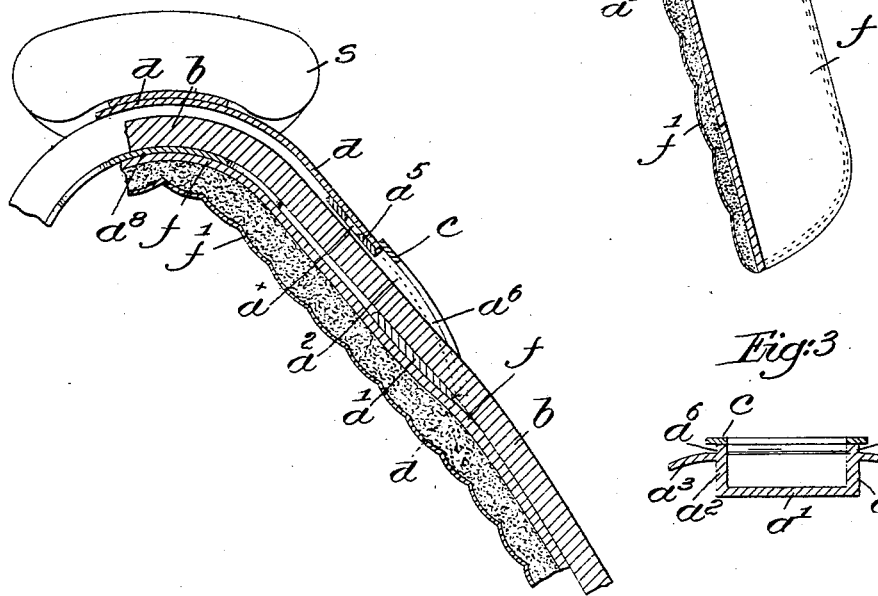
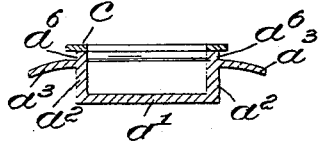
Witnesses.
Thomas J. Drummond
Fred S. Greenleaf
Inventor.
George Theobald
by Crosby & Gregory
Attys.
THE NORRIS PETERS CO., PHOTO-LITHO., WASHINGTON, D. C.

UNITED STATES PATENT OFFICE.

GEORGE THEOBALD, OF BOSTON, MASSACHUSETTS, ASSIGNOR OF ONE-FOURTH TO GEORGE THEOBALD, JR., OF PROVIDENCE, RHODE ISLAND.

SADDLETREE.

SPECIFICATION forming part of Letters Patent No. 564,726, dated July 28, 1896.

Application filed September 9, 1895. Serial No. 561,892. (No model.)

*To all whom it may concern:*

Be it known that I, GEORGE THEOBALD, of Boston, county of Suffolk, State of Massachusetts, have invented an Improvement in Saddletrees, of which the following description, in connection with the accompanying drawings, is a specification, like letters on the drawings representing like parts.

This invention relates to harness-saddletrees, and has for its object the production of a light, strong, and durable saddletree of novel construction, so arranged that the back-band boxes form an integral part of the tree, which latter is provided with a retaining-flange to engage and hold the jockey in place.

The construction of the tree is such that a running back-band is provided for, and the skirt is attached to the tree to effectually prevent the tree from rubbing the back of the animal.

In accordance therewith my invention consists in a saddletree embodying features of construction hereinafter described in the specification and particularly pointed out in the claims.

Figure 1 is a perspective view of a saddletree embodying my invention, the jockey and padded skirt being only partly shown on one arm of the tree. Fig. 2 is a partial sectional view of the tree on the line $xx$, Fig. 1; and Fig. 3 is a transverse sectional view of one of the tree-arms on the line $x'\,x'$, Fig. 1.

I have herein shown the tree as made of metal, cast or otherwise suitably shaped, the frame $a$ being flared at the ends $a'$ of the arms and upturned front and back at $a^2$ and thereafter extending at substantially right angles to form like flanges $a^3$ at the front and back of the frame. The frame $a$ is cut out at $a^4$, and the flanges $a^3$ are connected by bridges $a^5$, having suitable holes $a^\times$ therein for the terret-screws.

As clearly shown in Fig. 1, the upturned portions or walls $a^2$ diverge at their lower ends from the lower edges of the cut-out portions or openings $a^4$ of the frame, forming, with the flaring portions $a'$, boxes integral with the tree to receive the back-band $b$, (shown only in Fig. 2,) thus doing away with the usual boxes which have to be attached to the tree-frame by screws or rivets.

The diverging side walls permit the necessary lateral movement of the back-band without bringing its edges against sharp corners, as in the boxes of usual construction, which are made just wide enough to receive the back-band, the sharp lower ends of such walls cutting into and frequently breaking the back-band.

The flaring bottom $a'$ makes a wide or extended bearing upon which the back-band rests and moves, the bottom extending to the side walls.

When the back-band is moved laterally, the side wall, against which its adjacent edge bears, tends to gradually direct it in the direction of the pull, distributing the strain over some distance along the edge.

Around the box portions of the tree just described the walls $a^2$ and bridge $a^5$ are preferably provided with an upturned rib $a^6$, (see dotted lines, Fig. 1,) upon which a metal cover-plate $c$ is secured by suitable rivets 10, the edges of the cover-plate projecting beyond the rib and over the flanges $a^3$ and the bridge to form a recess. (Clearly shown in Figs. 1 and 3.) This undercut recess receives the lower edge of the jockey $d$, which extends up beneath the tree-seat $s$, the jockey being cut to correspond to the shape of the recess, the overhanging edge of the cover-plate $c$ obviating the use of fastenings thereat to secure the jockey to the tree.

As best shown in Fig. 2, the walls $a^2$ gradually decrease in height toward the bottom $a'$ of the boxes, making a neat finish for the tree.

While I have shown the jockey-receiving recess as formed herein by mounting a cover-plate upon a rib around the back-band box, on account of the cheaper construction, it will be understood that by the use of a properly-cored mold the equivalent of the cover-plate $c$ could be cast directly upon the tree, but at an increased cost of construction.

The back-band $b$ is drawn in through the tree-boxes described beneath the bridges $a^5$ and over the cross-girth $a^8$ of the tree, as shown in Fig. 2, and the skirt $f$ (shown as cushioned at $f'$ upon its under side) is cut to engage the tree beneath the flanges $a^3$ and outside of the walls $a^2$, being secured to the tree in any suitable manner and keeping the tree-frame effectually off of the back of the animal.

My invention is not restricted to the precise construction and arrangement herein shown, as the same may be modified without departing from the spirit and scope of my invention.

I claim—

1. A saddletree having formed therein a back-band box provided with diverging side walls, to permit lateral movement of the back-band, and a flaring bottom portion connecting said walls, to provide a wide bearing for the back-band, substantially as described.

2. A saddletree having formed therein a back-band box provided with diverging side walls, a connecting-bridge, and an overhanging flange around the lower edge of said bridge and the tops of the side walls, to retain the jockey in place, substantially as described.

3. A saddletree having upturned walls at front and rear, overhanging flanges extended outwardly from the tops of said walls, and a cushioned skirt held in place beneath said flanges and against the walls, said cushion portion forming a substantially flat under surface for the saddletree and protecting the back of the animal, substantially as described.

4. A saddletree having its lower ends flared and cut away above said flared portions, upturned walls diverging at the flared portions to form back-band boxes, a bridge at each side of and in the upper plane of the tree, and retaining-flanges on the outer face of the tree adjacent the boxes, to retain the lower end of the jockey in place, substantially as described.

In testimony whereof I have signed my name to this specification in the presence of two subscribing witnesses.

GEO. THEOBALD.

Witnesses:
GEO. W. GREGORY,
ALEX. C. PROUDFIT.